United States Patent [19]
Fasulo, II et al.

[11] Patent Number: 5,937,004
[45] Date of Patent: *Aug. 10, 1999

[54] APPARATUS AND METHOD FOR VERIFYING PERFORMANCE OF DIGITAL PROCESSING BOARD OF AN RF RECEIVER

[76] Inventors: Albert Joseph Fasulo, II, 3618 Macalpine Rd., Ellicott City, Md. 21042; Anthony Dean Haines, 4366 Sycamore Dr., Hampstead, Md. 21074; Martin William Schlining, III, 137 Dorchester Rd., Glen Burnie, Md. 21060

[*] Notice: This patent is subject to a terminal disclaimer.

[21] Appl. No.: 08/322,855

[22] Filed: Oct. 13, 1994

[51] Int. Cl.⁶ .............................. H04B 3/46; H04B 17/00
[52] U.S. Cl. ........................ 375/224; 370/241; 455/226.1
[58] Field of Search ........................ 375/211, 224, 375/227, 285; 379/1; 455/67.1, 226.1, 226.2; 371/20.1, 20.2, 20.4, 22.5, 27.1, 35, 41, 57.1; 370/241

[56] References Cited

U.S. PATENT DOCUMENTS

| | | | |
|---|---|---|---|
| 4,143,322 | 3/1979 | Shimamura | 325/320 |
| 4,318,049 | 3/1982 | Mogenson | 329/50 |
| 4,466,108 | 8/1984 | Rhodes | 375/83 |
| 4,787,096 | 11/1988 | Wong | 375/120 |
| 4,879,728 | 11/1989 | Tarallo | 375/80 |
| 4,996,695 | 2/1991 | Dack et al. | 375/224 |
| 5,268,928 | 12/1993 | Herh et al. | 375/222 |
| 5,271,035 | 12/1993 | Cole et al. | 375/224 X |
| 5,282,224 | 1/1994 | Harada | 375/224 |
| 5,299,257 | 6/1994 | Fuller et al. | 379/1 |
| 5,309,477 | 5/1994 | Ishii | 375/224 |
| 5,341,399 | 8/1994 | Eguchi | 375/224 |
| 5,450,440 | 9/1995 | Nishihara et al. | 375/224 |
| 5,539,772 | 7/1996 | Fasulo, II et al. | 375/224 |

OTHER PUBLICATIONS

Connelly, "Design of the Westinghouse Series 1000 Mobile Phone," IEEE, pp. 347–350, May 18, 1993.
Connelly, "The Westinghouse Series 1000 Mobile Phone: Technology and Applications," IEEE, pp. 375–379, May 18, 1993.

*Primary Examiner*—Chi H. Pham
*Assistant Examiner*—Bryan Webster

[57] ABSTRACT

A testing apparatus for the digital processing portion of a satellite receiver. A software program generates an (I) and (Q) file of root cosine filtered (I) and (Q) DQPSK modulated sampled waveform. The waveform is coupled to a test board that stores the files in a PROM and generates the waveform at a rate determined by the receiver being tested. The output of the test board replaced the A/D converter of the receiver for testing. The waveform impairments are added to the stored software waveform.

17 Claims, 10 Drawing Sheets

APPARATUS AND METHOD FOR VERIFYING PERFORMANCE OF DIGITAL PROCESSING BOARD OF AN RF RECEIVER

BACKGROUND OF THE INVENTION

1. Field of the Invention

The present invention relates to an apparatus and method for testing the performance of a communication receiver, and more particularly, to an apparatus and method for verifying the performance of a digital portion of an RF receiver.

While the invention is subject to a wide range of receiver applications, it is especially suited for testing the performance of a digital receiver for a satellite communication system capable of receiving quadrature phase shift keyed signals for voice and data, and is described in that connection.

2. Description of Related Art

In a typical satellite communication system, incoming signals from a conventional wired telephone are conducted from the public switch telephone network to a satellite ground station, which in turn transmits RF signals to the satellite for retransmission to a mobile terminal unit. Presently, a satellite system that covers large geographical areas typically use several satellites that follow different paths at low or medium altitudes so that at least one satellite is at all times covering the desired geographical area. From the standpoint of receiving signals, the low and medium altitude satellites have the advantage of being able to transmit a signal that reaches a mobile terminal unit at the earth's surface with a relatively large amplitude and without appreciable fading. It has been proposed, however, to provide a satellite communications network that utilizes a high altitude geosynchronous satellite which is capable of covering an area corresponding to a substantial portion of the North American Continent, so that a total of approximately six satellite beams will cover the entire Continent from Alaska to Mexico. The satellite for such a network will be approximately 22,600 miles above the equator and will be designed to operate in the L-band of RF frequencies. Energy traveling this great distance undergoes huge attenuation such that the power flux density incident at the antenna of the mobile unit is approximately $10^{-14}$ watts per square meter. This grossly attenuated signal is further degraded by background noise, and other satellite channel impairments such as Rician fading, gaussian noise, phase noise, and co-channel and adjacent channel interference.

Mobile terminal units capable of receiving these highly attenuated and impaired signals have been developed. One type of such mobile terminal includes a satellite receiver that has analog, digital and software subsections. In order to ensure that the digital and software subsections are capable of working as intended, it is of course advantageous to test such sections prior to completing assembly of the unit. However, in order to insure that the digital and software positions are defect free, it is necessary to subject the input of the digital processing board to digital signals corresponding to signals that the RF section of the receivers would receive including signals that would be received under adverse conditions.

To the knowledge of the inventors, no conventional apparatuses is in verify the proper operation of a digital processor board of a digital receiver.

In light of the foregoing, there is a need for an apparatus and method of verifying the performance of the processing board of a digital receiver in response to digital signals that correspond to signals having all of the possible interferences and impairments received from the satellite of a system in actual operation.

SUMMARY OF THE INVENTION

Accordingly, the present invention is directed to an apparatus and method for verifying the performance of a digital processor board of a satellite receiver that substantially obviates one or more of the problems due to limitations and disadvantages of the related art.

One of the advantages of the present invention is its ability to verify the performance of the digital portion of a satellite receiver under conditions of signal impairment and interference, and yet is relatively inexpensive to manufacture.

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims as well as the appended drawings.

To achieve these and other advantages and in accordance with the purpose of the invention as embodied and broadly described, the invention is an apparatus for testing the capability of digital hardware and software of a digital RF receiver for a communication system wherein the digital receiver has a digitized input for connection to an output of an analog to digital converter and has a user interface. The apparatus has a memory for storing a sampled waveform with at least one impairment, and the memory has an output for coupling to the digital input of the receiver, and an input when activated for reading the stored waveform from the memory into the input of the digital receiver. An address controller which has an output connected to the memory input, and has a frequency determining terminal responsive to a clock of the digital receiver, is provided for activating the memory to apply the sampled waveform at a frequency determined by the receiver being tested. A user interface is responsive to the application and processing of the sampled waveform to monitor the operation of the digital receiver.

In another aspect, the present invention is a method of testing the capability of the digital hardware and software of a digital RF receiver for a communication system, wherein the digital receiver has a digital input for connection to an output of an analog to digital converter and has user interfaces, the method comprising the steps of creating a digitally-sampled waveform having at least one impairment; storing the digitally-sampled waveform in a memory device; applying the stored waveform to the input of the digital receiver at a frequency determined by a clock of the digital receiver; and monitoring the user interface of the receiver during the application of the stored waveform to the digital input.

It is to be understood that both the foregoing general description and the following detailed description are exemplary and explanatory and are intended to provide further explanation of the invention as claimed.

The accompanying drawings which are included to provide a further understanding of the invention and are incorporated in and constitute a part of this specification, illustrate one embodiment of the invention and together with the description serve to explain the principals of the invention.

DESCRIPTION OF THE PREFERRED EMBODIMENT

Figure 1:
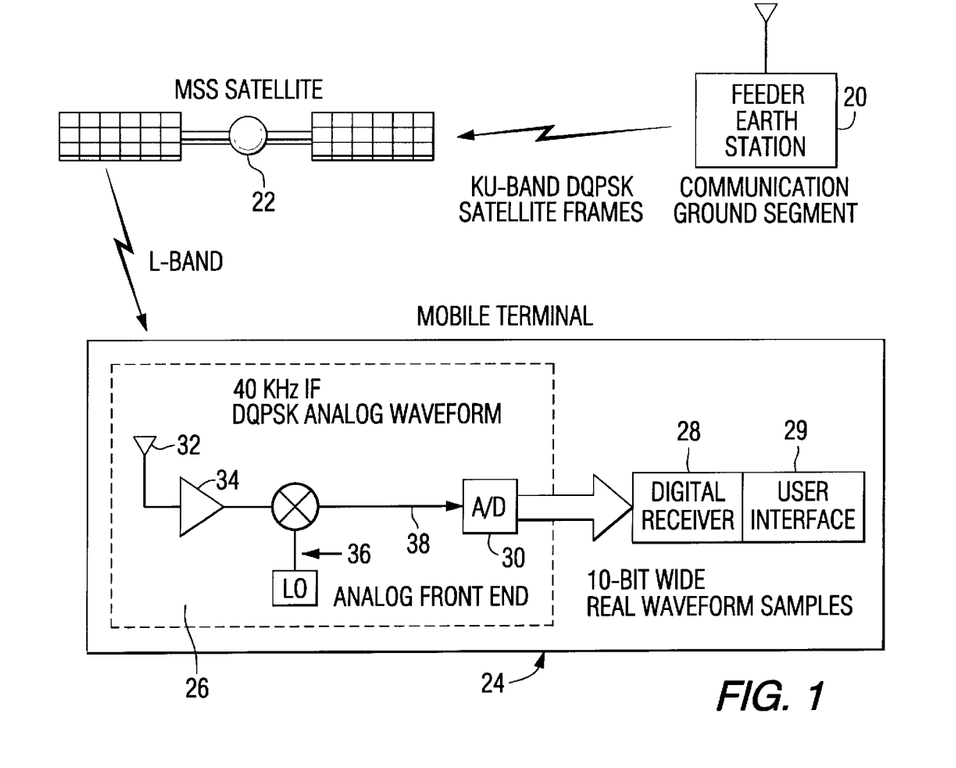
FIG. 1 is a schematic block diagram of a satellite communication system with which the receiver is intended to operate.

Prior to describing the details of the preferred embodiment of the present invention, reference is made to FIG. 1, in which the signals received by a mobile terminal 24 are generated at a communication ground segment or feeder earth station 20 and transmitted to a satellite 22 in the form of Ku-band differential quadrature phase shift keyed (DQPSK) satellite frames. The satellite 22 in turn transmits the satellite frames over the L-band to the mobile terminal 24. The mobile terminal 24 has an RF analog section 26, a digital receiver section 28, and user interface 29. The digital receiver section 28 which is able to be tested in accordance with the present invention is coupled to the RF section 26 by an analog to digital converter 30. The receiver 24 is coupled to the satellite 22 via an antenna 32. The signal from the antenna 32 goes through a low noise amplifier 34, the output of which is down-converted at 36 to provide a DQPSK analog waveform on line 38 input to the A/D converter 30. The converter 30 transforms the analog waveform to 10 bit wide real waveform samples that are processed by the digital receiver 28.

Figure 2B:
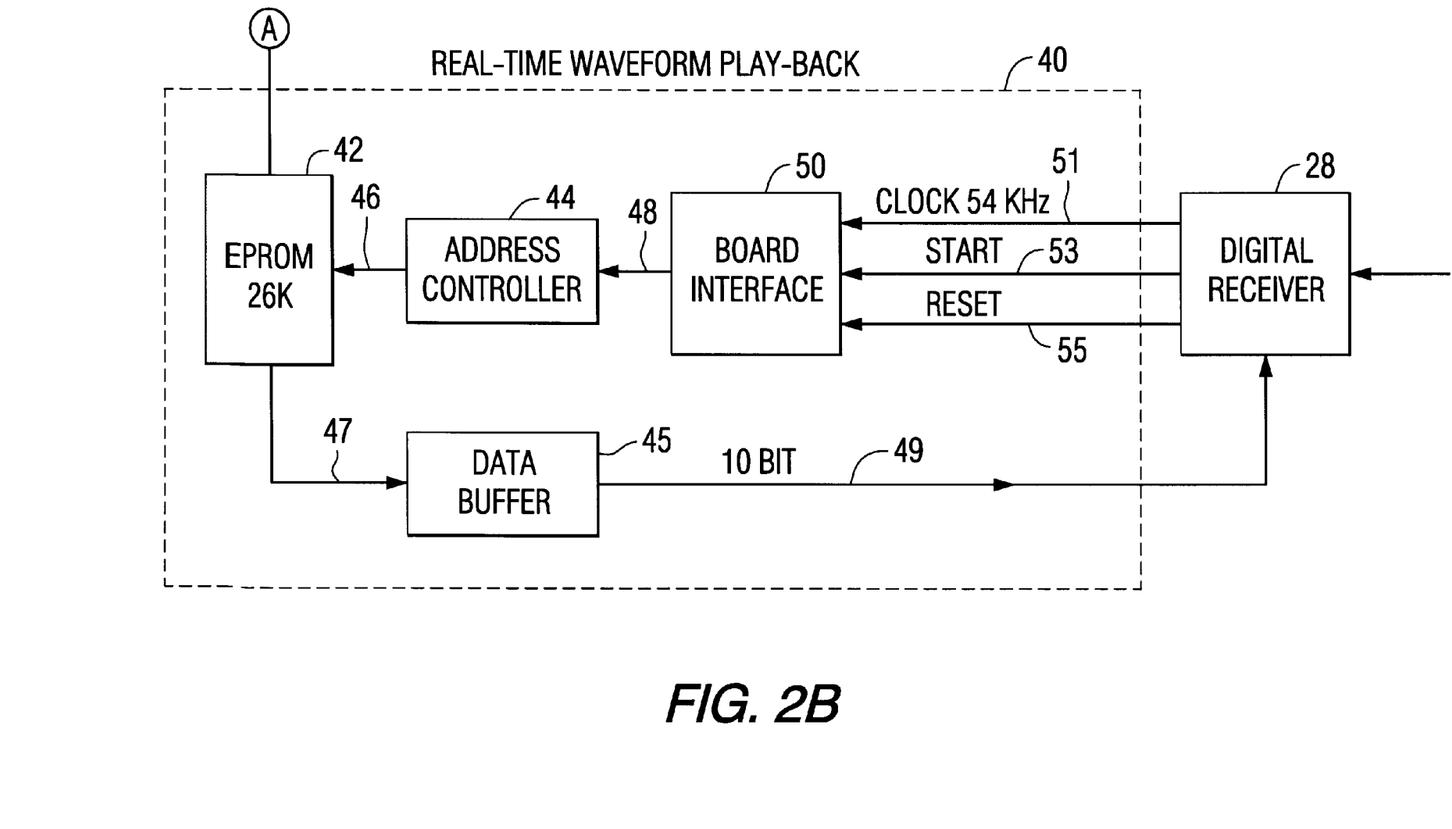
FIG. 2B is a schematic block diagram of the apparatus for playing back the waveform in real time in accordance with the present invention.
Figure 3:
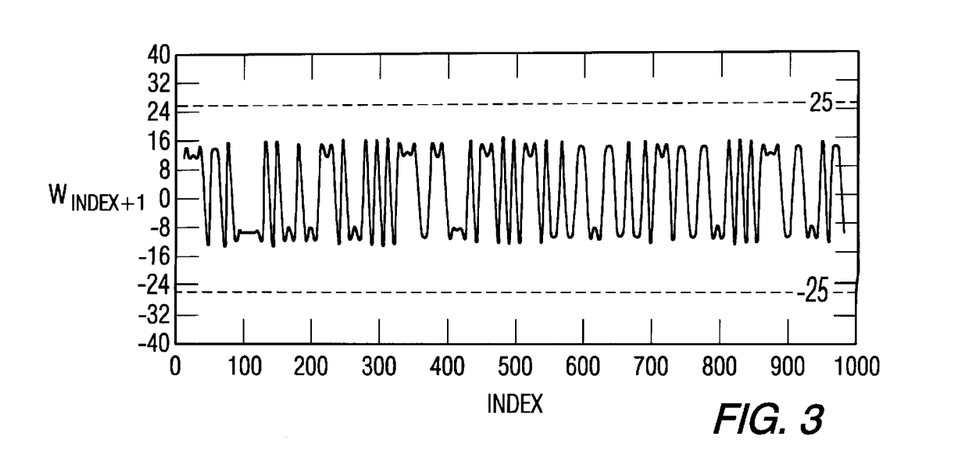
FIG. 3 is a graph of the sampled waveform stored in the memory.

In accordance with the present invention, the apparatus comprises a memory having a stored sampled waveform with an output for connection to a digital input of the receiver and an input when activated for applying the stored waveform to the digital input of the receiver at a frequency determined by the receiver. As herein embodied and referring to FIG. 2B, a test board 40 includes a memory 42, which is preferably a well known erasable programmable read only memory (EPROM) known as part No. 27C240 manufactured by Texas Instruments Co. The EPROM 42 stores sample data of a simulated offset base band signal. The base band signal is offset 50.4 kHz and is stored as 10 bit width binary data. In one actual reduction to practice, the memory 42 with 256K bits generated the waveform at 54 kHz for ten seconds. In the event that it is desired to have a simulated waveform that lasts longer than 10 seconds, more than one PROM or EPROM can be used. An address controller 44 has an output 46 connected to the EPROM, and an input 48 connected to the output of a test board interface 50. Preferably the address controller is a four bit counter bearing well known part no. 74ACT161SC manufactured by Texas Instruments Co. A data buffer 45 has an input 47 connected to the output of the EPROM 42, and an output 49 over which the 10 bit waveform is applied to the input of the digital receiver 28. The data buffer is preferably the well known part no. 74 FCT 821 manufactured by Texas Instruments Co. The address controller 44 indexes the memory addresses of the EPROM at the sample rate of 54 kHz which is controlled by the clock of the digital receiver over line 51. The start of the processing is controlled over line 53 and reset over line 55. The interface 50 decodes the control lines 51, 53, and 55 from the digital receiver 28. Preferably, the interface 50 is a well known type of a programmable array logic device (PAL) designated by part number 22V10 manufactured by Atmel. With this information, the interface 50 indexes the memory addresses at 44 and enables the data buffer 45. The data buffer eliminates incorrect data from the bit stream being received by the digital receiver; and also establishes isolation when data is not or should not be on the data buss. FIG. 3 illustrates a portion of the length of the waveform stored in the memory 42; and is a digital representation of a 60% root-cosine filtered differential quadrature phase shift keyed (DQPSK) waveform of the type formed in the feeder earth station or ground segment 20 (see FIG. 1).

The mobile terminal has user devices which are coupled to and referred to collectively as user interface 29, which are used to monitor the performance of the digital portion of the receiver. The actual listening to the incoming signals verifies voice reception. The actual production of a FAX document tests the FAX reception. A personal computer having an RS 232 input connected to the mobile terminal is tested by comparing the digital train of the ones and zeros with the trains of ones and zeros of the original text file.

In accordance with the method and apparatus of the invention, the waveforms for the main and interference channels are formed into an encoded, framed ASCII data file stream of ones and zeros that emulate framed encoded signals produced in the digital portion of the ground segment.

Figure 2A:
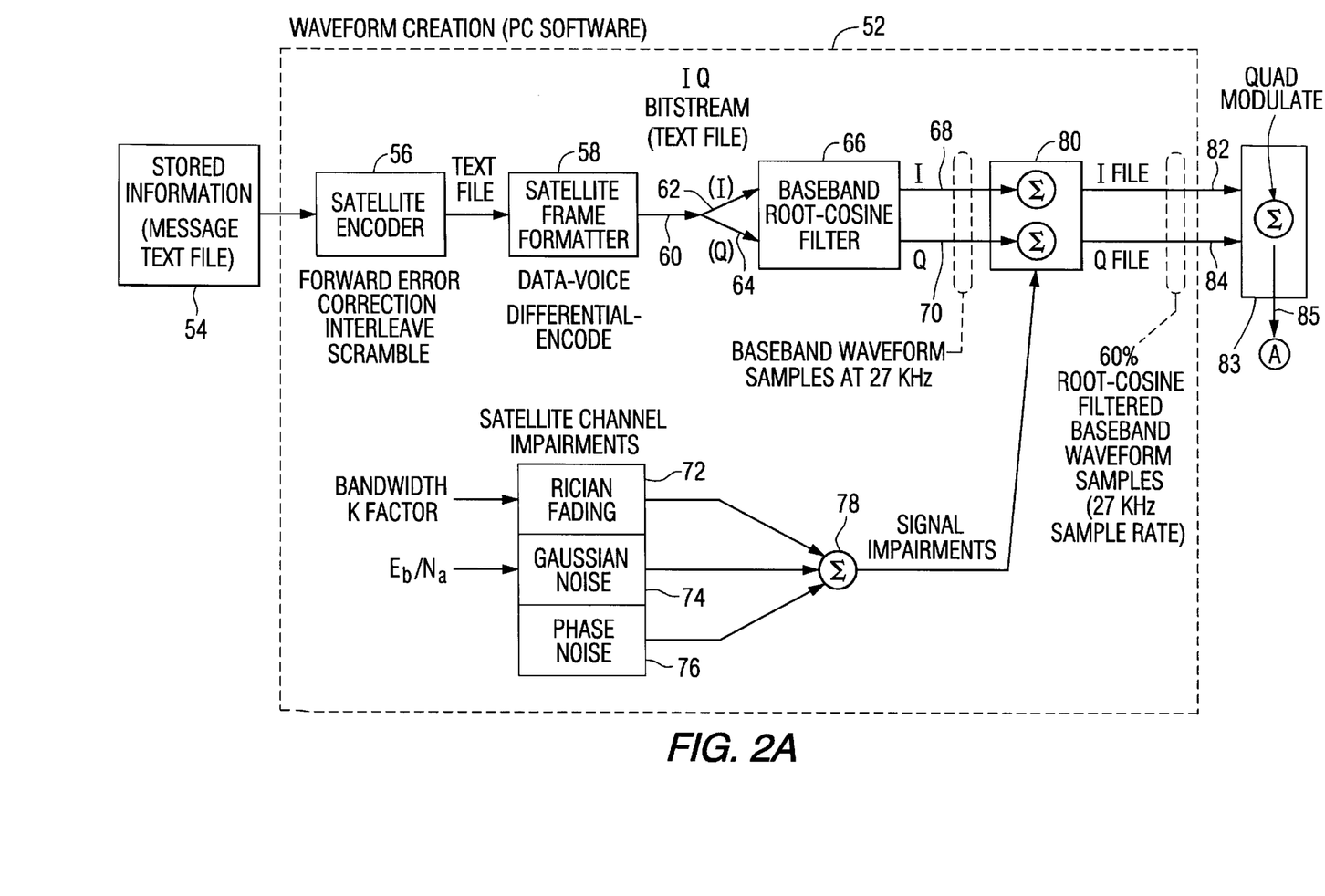
FIG. 2A is a schematic block diagram illustrating the creation of the waveform in accordance with the present invention.

As herein embodied and referring to FIG. 2A, the schematic block diagram within dashed lines 52 is a flowchart illustrating the creation of the waveform, which is preferably implemented in TURBO C software. A message text file at block 54 is a stored ASCII information file stream of ones and zeros that would ordinarily be introduced at the beginning of the digital portion of the transmitter of the ground segment 20 (FIG. 1) for processing and transmission to the mobile terminal 24 via the satellite 22. The stored ASCII file stream is then output to a satellite encoder 56 and a satellite frame formatter 58 to provide an output on line 60 that corresponds to an encoded, framed ASCII data file stream of ones and zeros that represents framed, encoded data as it would be produced at the ground segment or feeder earth station 20 at the end of the satellite communication link.

In creating the waveform, the encoded framed data, consisting of ones and zeros, is separated into odd bits and even bits on lines 62 and 64, respectively, at the input to a base band root-cosine filter 66. The filter 66 produces the root cosine filtered (I) and (Q) base band digitally-sampled waveform files on lines 68 and 70.

In accordance with the invention calibrated satellite channel impairments are digitally summed with the unimpaired (I) and (Q) filtered waveforms. The (I) and (Q) samples with the digitally summed impairments are then quadrature modulated and summed to correspond to a digitally-sampled waveform. The digitally-sampled waveform is scaled from a floating point PC representation to a 10 bit fixed point representation.

As herein embodied, selected satellite channel impairments, such as Rician fading, represented at block 72, gaussian noise represented at block 74, and phase noise represented by block 76 are output either singly or in selected combinations to a summing device 78 where they are digitally added to both the (I) and (Q) base band waveform samples at the summing devices of block 80. The block 80 generates an (I) and a (Q) file on lines 82 and 84 respectively that are impaired in accordance with the output of the summing device 78. Thus, the waveform samples on lines 82 and 84 are 60% root-cosined filtered base band waveform samples formed at a rate of 27 kHz. The (I) and (Q) waveform samples are quadrature modulated and summed at steps 83 and stored in the EPROM 42 over line 85.

Once the EPROM is programmed, the board 40 is connected at its output via the data buffer 45 to the digital input of the receiver. This connection substitutes the board 40 for the A/D converter 30 of the actual receiver 24. The lines 51, 53, and 55 of the board interface 50 are connected to the receiver. The receiver is then activated, and then the clock of the receiver causes the reading out of the waveform at 54 kHz. Depending on the type of data in the data file at 54, either the voice, FAX, or computer input can be tested.

Figure 4:
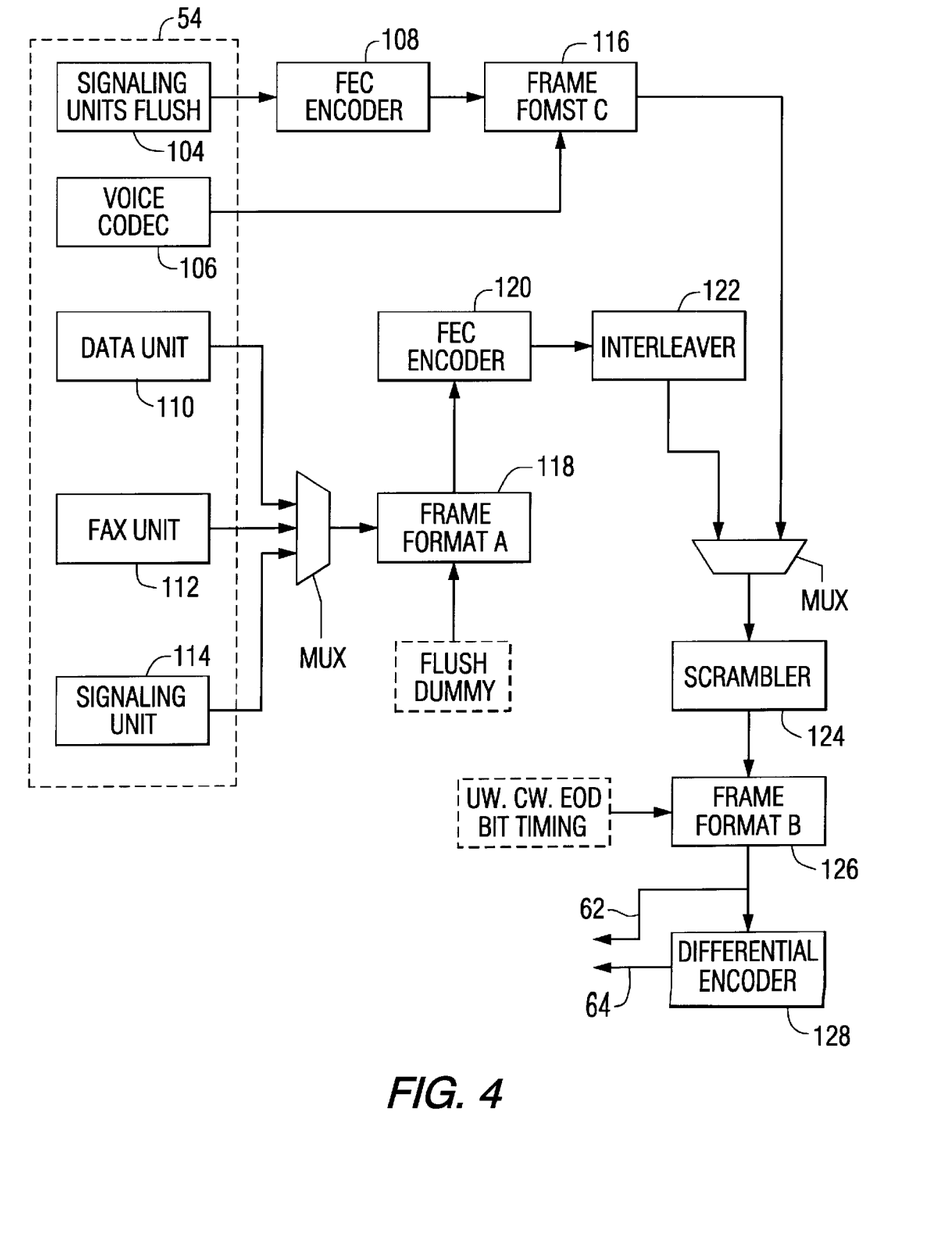
FIG. 4 is a more detailed flow chart of the voice and data encoding sequence of the satellite encoder function illustrated in FIG. 2A.

The flowchart of FIG. 4 illustrates the various algorithms and their sequence of operation for performing the functions 54, 56, and 58, in creating the waveforms described in connection with FIG. 2A. The ASCII message text files 54 that are stored in the PC computer relate to both voice and data and correspond to the text files having the series of ones and zeros input to the digital portions of the transmitter of the ground station 20. The text files represented by blocks 104 and 106 of FIG. 4 are used in testing the voice capabilities of the receiver. Block 104 which responds to the voice Codec block 106 resets, as required, the forward error correction encoder represented by block 108. Block 106 is a text file that represents voice signals received by the ground station 20. The files 104 and 106 preferably include enough data to activate the receiver with information for a period of approximately ten seconds.

The ASCII text files corresponding to the input of data to the digital portion of the ground station 20 for testing the operation of the receiver are represented by block 110 which is used for testing the capability of the signals for operating a computer coupled to the mobile terminal, and by block 112 for testing the capability of the receiver for operating a fax machine. Block 114 is the text for the signalling unit in the formation of the data frame formats.

The algorithms for encoding the signalling units 108 and the frame formatting algorithm 116 respond to the text files of 104 and 106 to provide the voice activation/deactivation logic that allows the mobile terminal to turn on and off the transmitted carrier when the user is talking or silent. The voice Codec file 106 detects, and reports to the transmit framing logic 116, the presence or absence of speech energy. The voice activation logic of blocks 104 and 108 respond accordingly to the voice present indications. The frame formatting algorithms at block 116 perform the satellite frame formatting of voice signals. The algorithm for formatting the frame of data in transmitting a fax or operating a computer is represented at block 118. The framed data is then encoded by an algorithm at block 120. In encoding the data, a forward error correction (FEC) of data is used having a constraint length of 7 (K=7) of convolutional coding scheme. Depending upon the frame structure, voice, data, or signalling, the mobile terminal requires either a one-half, one-third, or three-quarters coding rate. The FEC algorithms at block 108 and 120 is performed on every bit received from the informational text file at a rate of 6750 baud. The algorithm performed at block 122 (interleave) is a process of reordering a time ordered series of bits or a packet of data in time. This algorithm is performed on every input bit at the rate of 6750 baud. A scrambler algorithm at block 124 is performed on both the voice and the data information. This algorithm performs an exclusive or (XOR) between the information bit and a scrambling security (random) key bit; and is used to provide a level of transmission security over the satellite link. It also randomizes the data to help the demodulator of the receiver perform symbol tracking. This algorithm 124 is also performed on every input bit from the information text file. A frame formatting function at block 126 utilizes unique words (UW) and unique data sequences (UW) to frame the transmitted informational data. This function also includes bit timing and end of data (EOD). The data stream is differentially encoded at block 128 to produce an (I) and (Q) output on lines 62 and 64.

In accordance with the present invention, the waveform of 60% root-cosine filtered base band samples is created for the main communication channel and each of a plurality of impairments. As herein embodied and referring to FIGS. 5A, 5B, 5C and FIG. 10, the means for encoding and frame formatting the information bits previously described in connection with FIG. 2A and FIG. 4 is provided in the computer for a main communication channel waveform represented by block 130, an upper co-channel interference waveform 132, a lower co-channel interference waveform 134, an upper adjacent channel interference waveform 136, and a lower adjacent channel interference waveform 138. Each one of the individual channels has, at its respective output (I) and (Q), a 60% root-cosine filter 66. For each (I) and (Q) output of the filter are impairments 72. The outputs of the impairments are commonly connected to a summing device 78. The (I) and (Q) outputs of the filter 66 are also directly connected to the summing device bypassing the impairments 72 through switches collectively referred to at 140. The switches 140 permit the operator to selectively impair the main channel and each one of the interference channels. The digitally summed interference channels and impairments are summed, scaled and formatted at the device 80 for eventual input on line 85 to the input of the EPROM 42 of the test board 40 via 83. Thus, the sampled base band impaired satellite signal waveform file is created, which may include interference waveforms as well as channel impairments, as selected by the operator.

Figure 6:
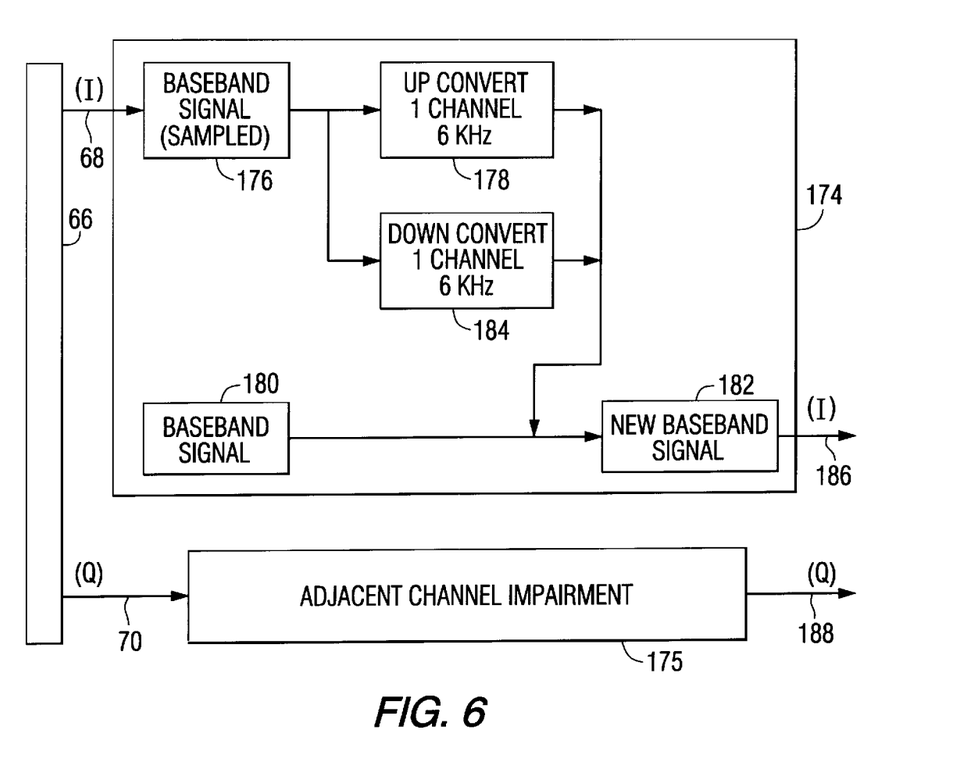
FIG. 6 is a flowchart illustrating the formation of the impairment, adjacent channel interference, in accordance with the present invention.

In selecting the upper end or lower adjacent channel interference, and/or the upper and lower co-channel, the base band samples from the root-cosine filter 66 are up and/or down converted to provide the desired interference. Referring to FIG. 6, block 174 includes algorithms for creating the interferer for the (I) data file from the filter 66. The block 175 is similar to block 174 and includes similar algorithms for the (Q) data file from the output of the filter 66. For the sake of brevity, the individual aspects of the interferer for the (Q) data file is omitted.

Figure 5A:
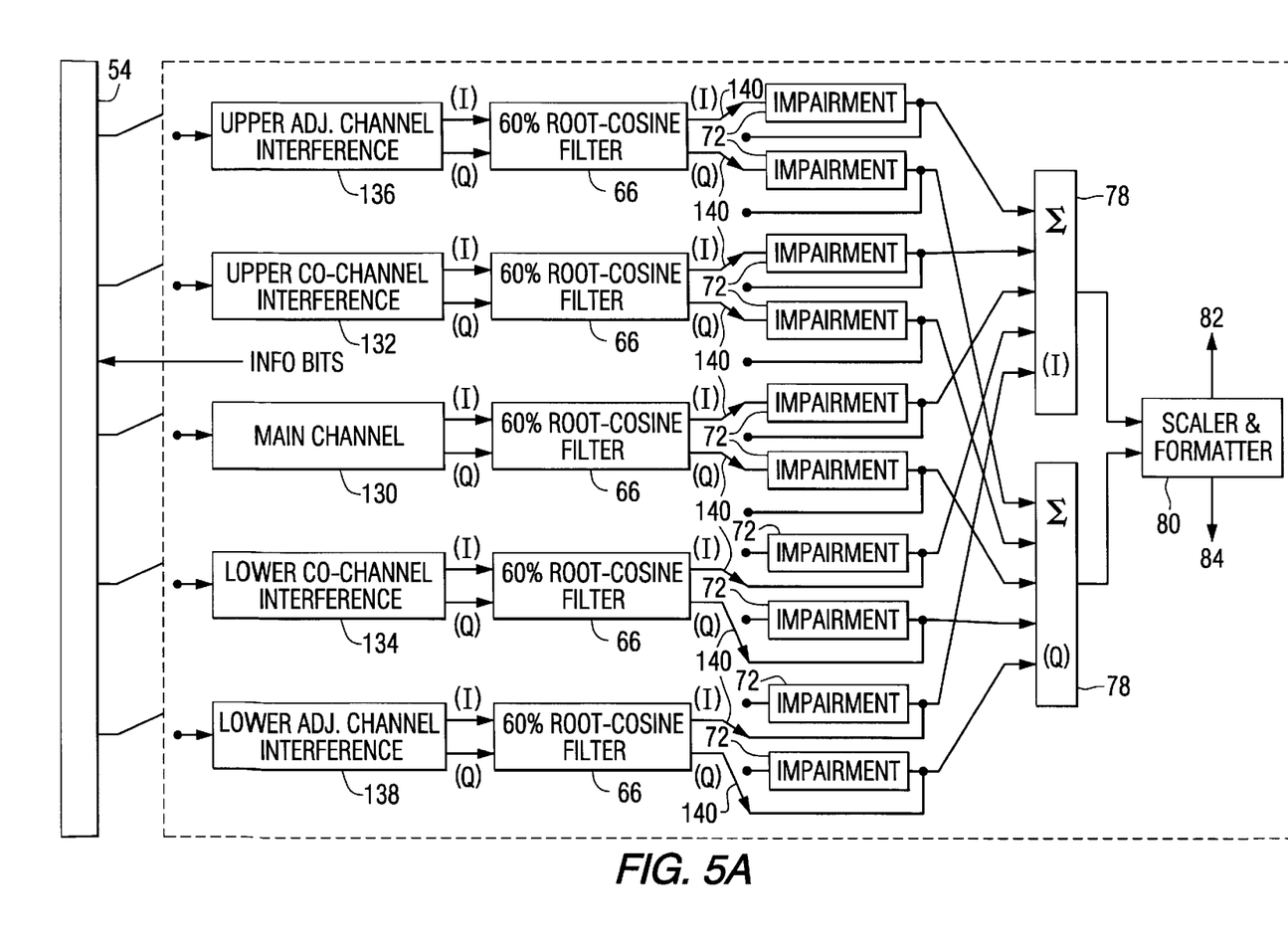
FIG. 5A is a flowchart illustrating the arrangement of the waveform creation illustrated in FIG. 2A for the various satellite channel impairments.

In FIG. 6, the sampled base band signal 176 is up converted at 178 and combined with the base band frequency signal 180 to produce a new base band signal at 182. For the lower adjacent channel interference, the sample base band signal 176 is down converted at 184 to provide the new base band signal represented at 182. For the upper adjacent channel, band signal samples are mixed with a 6 kHz local oscillator; and for the lower adjacent interference channel, the base band signal is mixed with a −6 kHz local oscillator. The co-channel interferers as shown in FIG. 5A are similar to the adjacent channel interferers, except that for the upper co-channel, a 3 kHz oscillator is mixed with the base band signal and for a lower co-channel interference −3 kHz oscillator is mixed with the base band channel. A new base band signal 182 for the (I) data file is output at line 186 and the new base band signal output for the (Q) data file is output at line 188.

Figure 7:
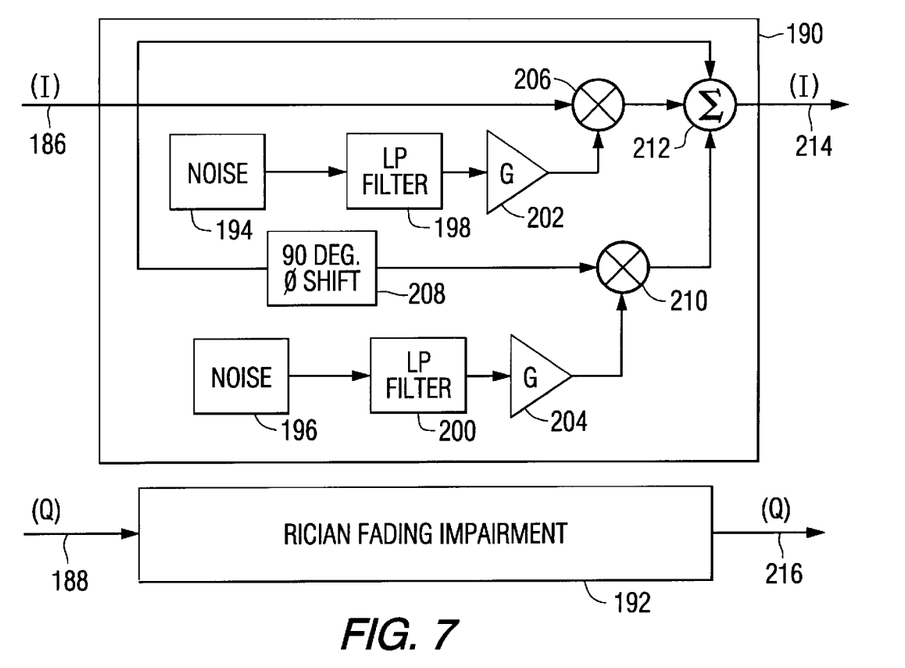
FIG. 7 is a flow diagram illustrating the formation of the impairment, Rician fading, in accordance with the present invention.

Referring to FIG. 7, block 190 is the algorithm for Rician fading impairment for the (I) data file; and block 192 represents the Rician fading impairment for the (Q) data file. The impairment 190 has an input connected to the output 186 of the adjacent channel impairment. Block 192 has an input 188 connected to the adjacent channel impairment for the (Q) data file. For the Rician fading impairment, uncorrelated gaussian noise is generated at 194 and 196. The generated noise from source 194 is filtered at a low pass finite impulse response filter 198. The noise from 196 is filtered by a low pass finite impulse response filter 200. The signal at the output of the low pass filter 198 is amplified by an amplifier 202 and the output of the low pass filter 200 is amplified by amplifier 204. The signal on output 186 is multiplied by the generated noise at 206 and the generated noise from 196 is multiplied by the signal on 186 which is shifted in phase at 208 by multiplier 210. The output of the multipliers 206 and 210 are summed with the output on line 186 at device 212. A similar algorithm is provided from mixing the Rician fading impairment with the signal from the (Q) data file at block 192. The signal that is impaired by Rician fading is output for the (I) data file at 214 and the signal subjected to Rician fading for the (Q) data file is output at 216. The filters 198 and 200 are preferably of the type referred to as a second order Butterworth.

Figure 8:
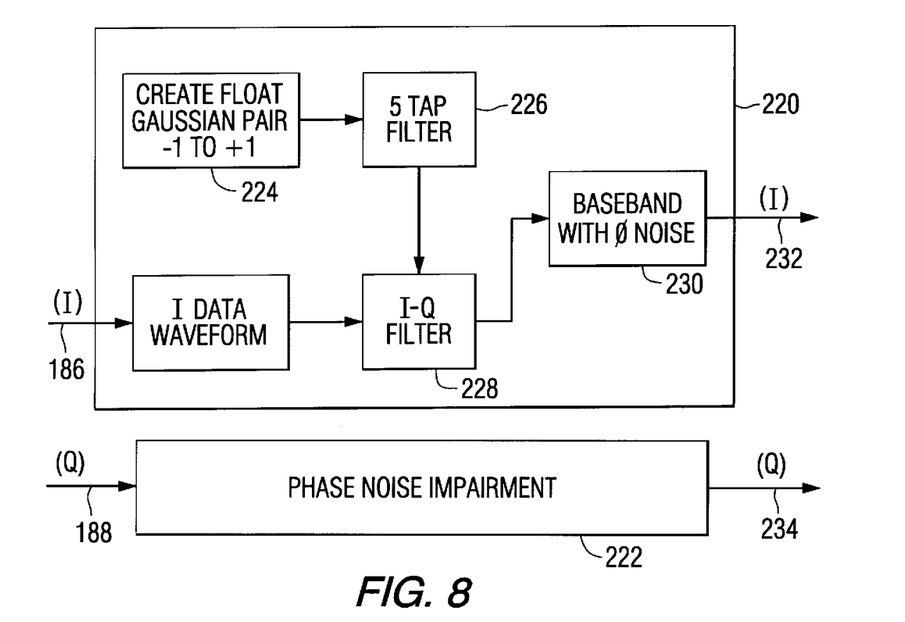
FIG. 8 is a flowchart illustrating the formation of the impairment, phase noise, in accordance with the present invention.

Referring to FIG. 8, an algorithm for creating phase noise is illustrated by block 220 for the (I) data file and by block 222 for the (Q) data file. The phase noise impairment algorithm 220 has as an input the (I) data file of the signal samples that are subjected to the Rician fading impairment; and the phase noise impairment 222 has as its input the (Q) data file of the signal having the Rician fading impairment. The phase noise impairment is a gaussian digital noise file at block 224. This is a gaussian pair with a floating number between −1 and +1. A digital noise file at 224 is then filtered at 226 and a filter 228 to obtain the desired phase noise mask. The data waveform from line 186 is then filtered at 228 to provide an output corresponding to a base band with phase noise at 230. The base band is then used as the modulation source in place of the tertiary frequency. The output on line 232 for the (I) file and the output on line 234 for the (Q) file outputs a signal n in accordance with the following expression:

$$newsig^n = oldsig_n \cdot e^{j2\pi \frac{FREQ}{SAMPLE\ RATE}} \cdot \phi\ noise$$

Figure 9:
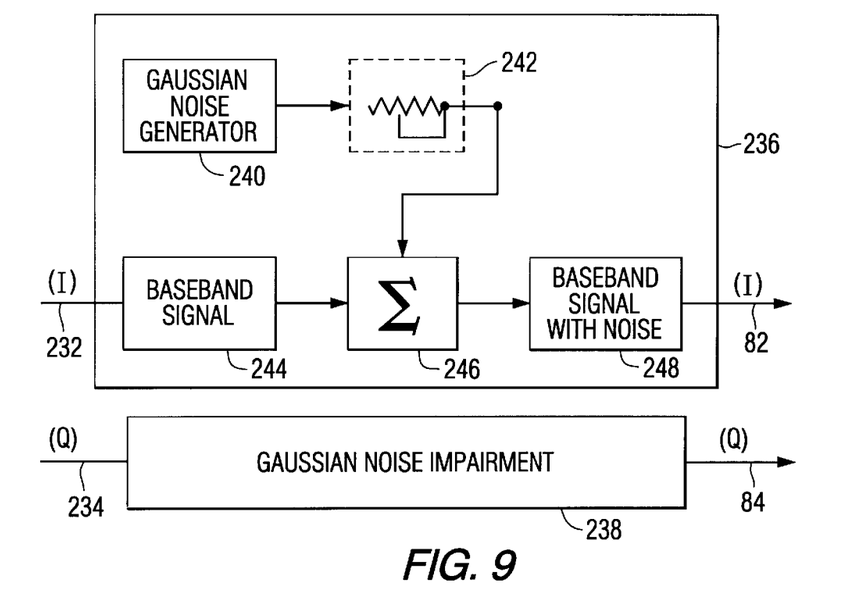
FIG. 9 is a flowchart illustrating the formation of the impairment, gaussian noise, in accordance with the present invention.
Figure 10:
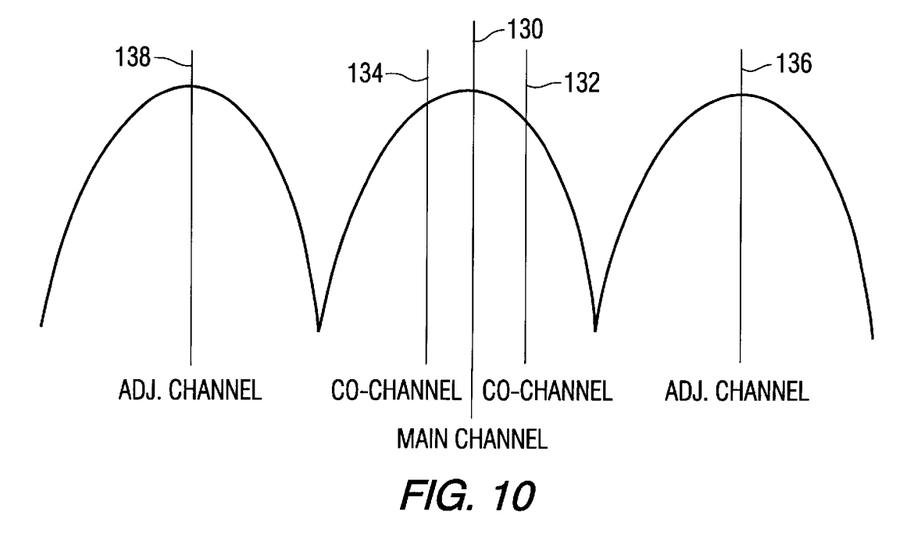
FIG. 10 is a graph schematically representing the relationship of co-channel and adjacent channel interferences to the main channel in accordance with the present invention.

Referring to FIG. 9, the gaussian noise impairment for the (I) data file is represented at block 236; and the gaussian noise impairment for the (Q) data file is represented at block 238. The gaussian noise is created by using a random number generator 240 which is then scaled at 242. The gaussian noise generator 240 together with the base band signal 244 creates two uncorrelated signal sources that are summed at 246. The summed base band signal, which may have one or more of the impairments previously described is summed at 246 to provide the base band signal with the gaussian noise impairment at 248. Thus, the base band signal for the (I) data file with the selected impairments is output on line 82 (see FIG. 3); and the output signal with the gaussian noise and selected impairments is output on line 84 for the (Q) data file. The impairments that include the interferers as well as the various channel impairments that include Rician fading, phase noise, and gaussian noise may be applied to the test signal selectively and in any combination desired by the operator for example, the main channel may be subjected to one or more of the various impairments. The interference channel may be subjected to one or more of the impairments; and the signal applied to the receiver may include one or more of the interference channels.

Figure 5B:
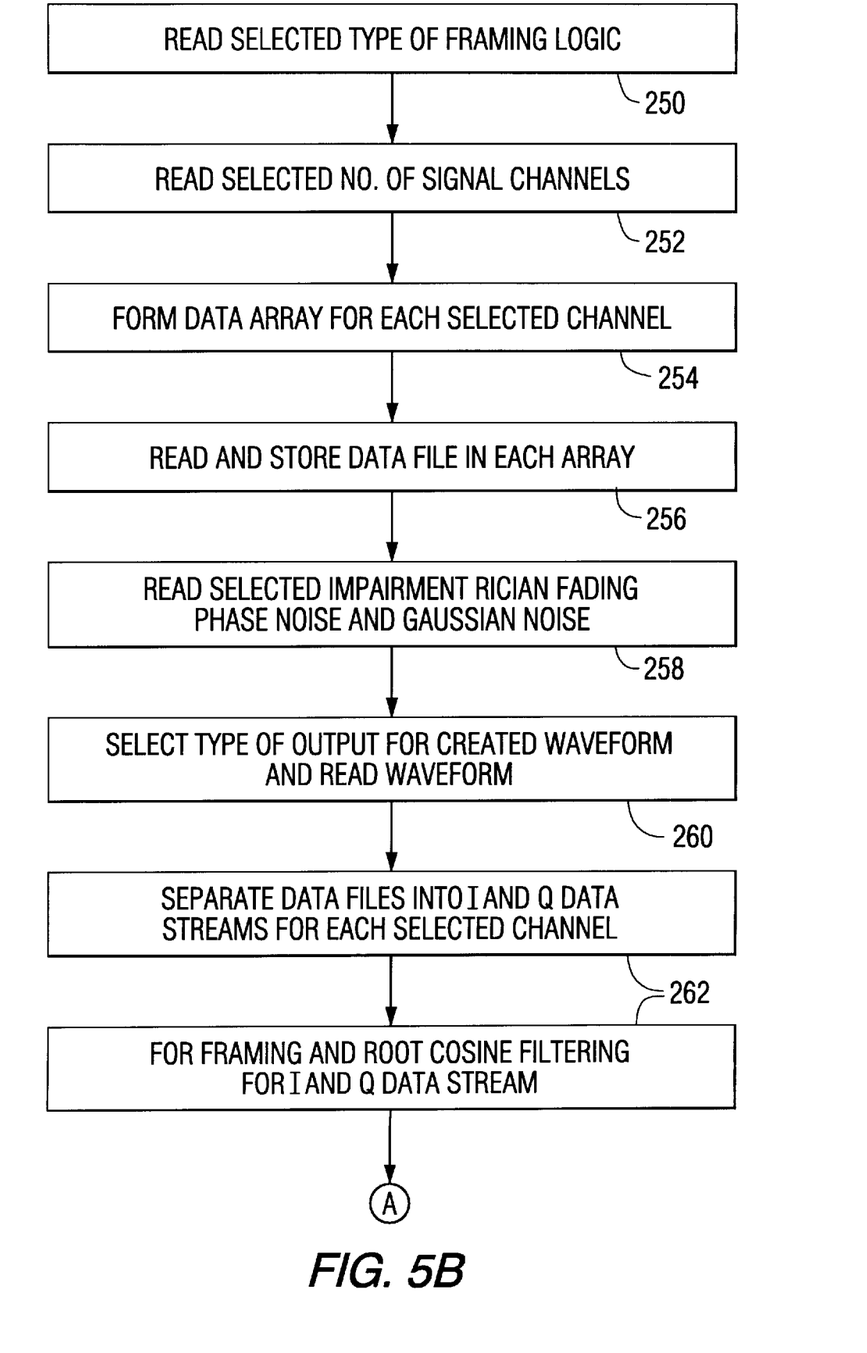
FIGS. 5B and 5C is a flowchart illustrating the process of creating the selected waveform with selected impairments.

The steps in the process of creating the impaired waveform is described with reference to FIG. 5B. The type of framing logic desired for testing the receiver is selected and read at step 250. This selection may be voice logic, data logic, or signalling units, for example. Then, the signal channels are selected and read at step 252. This selection may include one or more of the main channels, upper and lower co-channels, and upper and lower adjacent channels. If all channels are selected, there is a total of five according to the present embodiment. A data memory array is then allocated for each of the selected channels at step 254. The information text of data file 54 is then read and stored in each of the allocated arrays for the selected channels at step 256. The desired types of impairment are selected and read at step 258. At this step, if desired none of the impairments need to be added to the selected channels, or one or more may be added as desired. The type of output for the created waveform is selected and read at 260. This output, is an output for application to the interface board.

At this stage in the process, the step of framing and root-cosine filtering the data memory array for each of the selected runs of the five channels is performed at step 262. At the output of the root cosine filtering step, the selected channels are divided into separate (I) and (Q) data files. As previously mentioned, the impairments may be selectively added to the selected channels as desired. It is assumed that all of the impairments are selected in the following description.

Figure 5C:
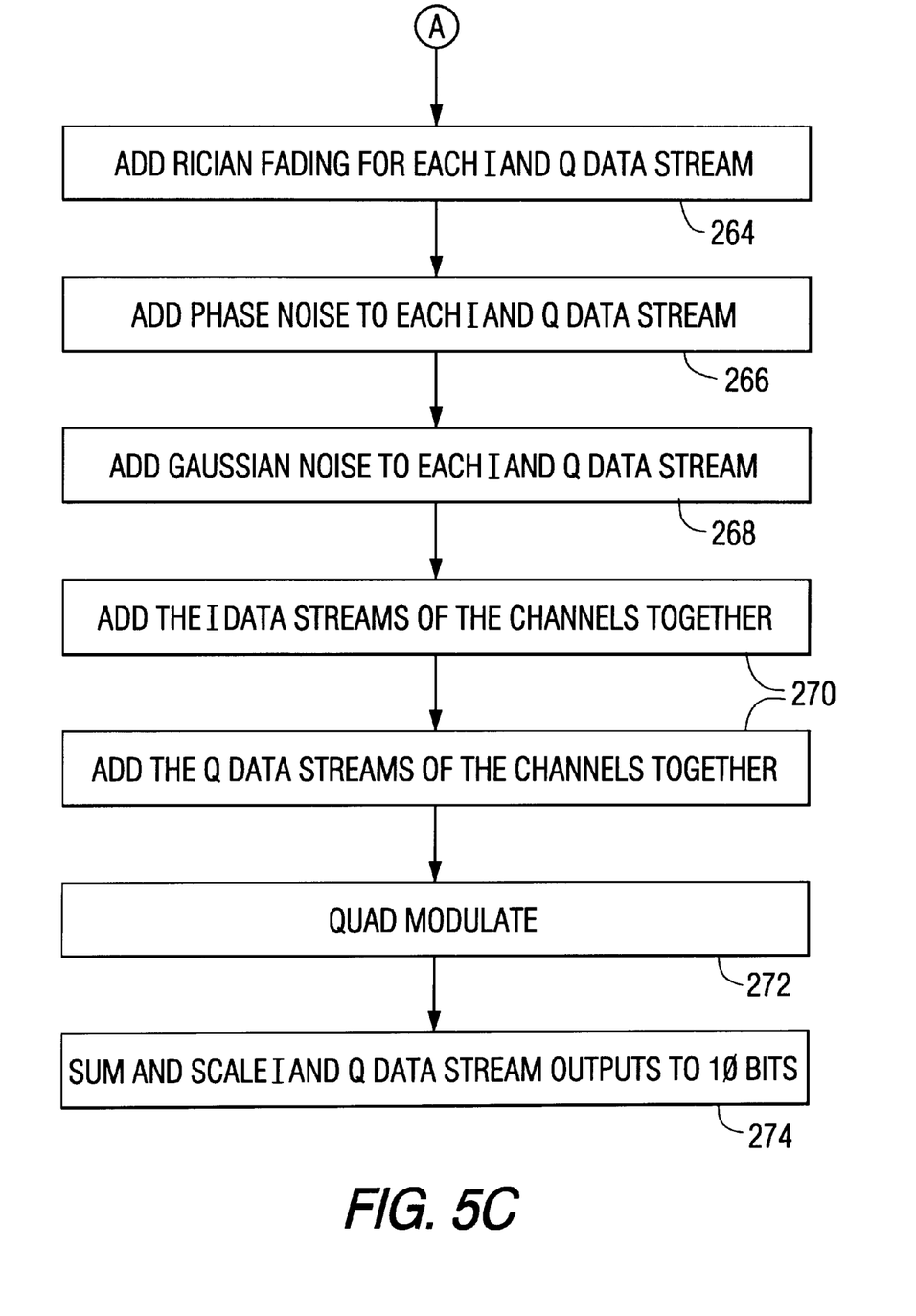

After filtering each of the selected channels, the Rician fading is added to the (I) data file and the (Q) data file at step 264 for each of the selected channels. Then, the phase noise impairment is added to the (I) and (Q) data files of the selected channels at step 266. Following this step, gaussian noise is added to the (I) and (Q) data files of the selected channels at step 268. The impaired signals from all of the selected are then added together to provide a single output for the (I) data files of the selected channels and a single output for the (Q) data files of the selected channels at step 270. The single data file output for each of the (I) and (Q) data files are quadrature modulated at step 272. The quadrature modulated waveforms are then combined and scaled to 10 bits at step 274.

The equations for combining the (I) and (Q) data files into a real signal for input over line 85 to the EPROM 42 is a two step process. In the first step, the output of the data files are subjected to a zero fill interpolation filter. In the zero fill, zeroes are inserted after each (I) sample and each (Q) sample. Real IϕIϕ

Imag QϕQϕ

This provides an output according to the following equation.

$$Output_m = \sum_{n=0}^{n-1} SIj_{m+n} \cdot coef_n$$

where sig is the zero fill input string and the complex coeffeicient is the interpolation filter. In the second step the base band signal is upconverted to an offset base band by taking a real part of the mixing process and obtaining a new output in accordance with the equation, $$output_n = e^{j2\pi \frac{(40.5)}{(54)} n}$$

In summary, the PC computer based waveform creation software is used to generate intermediate outputs in the (DQPSK) modulation chain. Specifically, the PC software generates the root-cosine filtered (I) and (Q) DQPSK modulated base band digitally sampled waveform files.

It will be apparent to those skilled in the art that various modifications and variations can be made in the apparatus and method of the present invention without departing from the scope of the invention. Thus, it is intended that the present invention cover the modifications and variations of this invention provided they come within the scope of the appended claims and their equivalents.

We claim:

1. A method of testing the capability of digital hardware and software of a digital receiver for a communication system wherein the digital receiver has a digital input for connection to an output of an analog to digital converter and has a user interface, the method of testing comprising the steps of:

creating a digitally sampled waveform having at least one predetermined impairment;

storing the digitally sampled waveform having the at least one predetermined impairment in a memory device;

applying the stored waveform to the digital input of the digital receiver at a frequency determined by a clock of the digital receiver; and monitoring the digital receiver during application of the stored waveform to the digital input;

wherein said step of creating the digitally sampled waveform comprises modulating in-phase and quadrature phase filtered base band signals.

2. The method of testing of claim 1, wherein said step of creating the digitally sampled waveform comprises the steps of:

forming an information file stream of binary bits corresponding to information required to be communicated over a simulated satellite link from a ground segment to the digital receiver on a satellite channel;

transforming the bits into satellite frame format representing framed and coded data corresponding to the information produced at a ground segment end of the simulated satellite link; and modulating the transformed bits to produce a final output file of modulated real sampled waveforms.

3. The method of testing of claim 2, wherein said step of transforming the bits into satellite frame format comprises the steps of:

maintaining real time frame timing of the bits to correspond to the satellite framed format;

performing forward error correction of the framed bits using a constraint length convolutional coding at a selected coding rate on each bit and using a Viterbi process to perform error detection and correction;

interleaving the corrected bits by taking a time ordered series of the corrected bits and reordering the corrected bits in time for each input bit at a selected baud rate;

performing an exclusive OR function between reordered bits and a scrambling security random key bit to produce the transformed bits, to provide transmission security for the simulated satellite link and to randomize data to assist demodulation by the digital receiver being tested to perform symbol tracking; and coding the transformed bits differentially for QPSK modulation.

4. A method of testing the capability of digital hardware and software of a digital receiver for a communication system wherein the digital receiver has a digital input for connection to an output of an analog to digital converter and has a user interface, comprising the steps of:

creating a simulated signal waveform data file;

programming a read only memory with the created waveform file;

coupling an output of the programmed read only memory to the digital input of the digital receiver;

activating the digital hardware of the digital receiver to read the output of the programmed read only memory at a rate determined by the digital receiver; and monitoring the digital receiver at the user interface.

5. The method of testing of claim 4, wherein said step of creating comprises creating the simulated signal waveform data file with at least one impairment.

6. The method of testing of claim 5, wherein said step of creating comprises:

reading a selected type of framing logic;

reading a selected number of signal channels;

forming a data array for each of the selected signal channels;

reading and storing an information data file in each of the data arrays;

reading at least one selected impairment corresponding to Rician fading, phase noise, and gaussian noise;

separating the stored information data files into in-phase and quadrature data streams for each of the selected signal channels;

performing framing and filtering for each of the in-phase and quadrature data streams;

adding the at least one selected impairment to each of the framed in-phase and quadrature data streams;

combining the impaired in-phase data streams of the selected signal channels;

combining the impaired quadrature data streams of the selected signal channels; and quadrature modulating the combined in-phase and quadrature data streams.

7. The method of testing of claim 6, wherein said step of reading a selected number of signal channels comprises the steps of:

reading a main signal channel;

reading an upper signal channel adjacent the main signal channel; and reading a lower signal channel adjacent the main signal channel.

8. An apparatus for testing the capability of digital hardware and software of a digital RF receiver, wherein the digital RF receiver has a digital input for connection to an A/D converter, the apparatus for testing comprising:

a programmable read only memory for storing a sampled waveform with at least one impairment;

an output terminal removably coupled to the digital input of the digital RF receiver;

an input terminal removably coupled to the digital RF receiver for receiving a control signal from the digital RF receiver;

the stored waveform being read out from said programmable read only memory into the digital RF receiver via said output terminal upon receipt of the control signal;

an address controller for outputting indexing signals to said programmable read only memory with a frequency selected in accordance with a clock output from the digital RF receiver to activate said programmable read only memory; and means for monitoring operation of the digital RF receiver during application of the stored waveform.

9. The apparatus for testing of claim 8, further comprising means for creating the sampled waveform by modulating in-phase and quadrature phase filtered base band signals to produce a root cosine digital quadrature phase shift keyed waveform.

10. The apparatus for testing of claim 9, wherein said means for creating the sampled waveform comprises:

means for forming an information file of binary bits corresponding to information required to be communicated over a simulated satellite link from a ground segment to the digital RF receiver on a satellite channel;

means for transforming the bits into satellite frame format representing framed and coded data corresponding to the information produced at the ground segment end of the simulated satellite link; and means for modulating the transformed bits to produce a final output file of modulated real sampled waveforms.

11. The apparatus for testing of claim 10, wherein said means for transforming the bits into satellite frame format comprises:

means for maintaining real time frame timing of the bits to correspond to the satellite frame format;

means for performing forward error correction of the framed bits using a constraint length convolutional coding at a selected coding rate on each bit and using a Viterbi process to perform error detection and correction;

means for interleaving for reordering the corrected bits in time for each input bit at a selected baud rate; and means for performing an exclusive OR function between reordered bits and a scrambling security random key bit to produce the transformed bits, to provide transmission security for the simulated satellite link and to randomize data to assist demodulation by the digital receiver being tested to perform symbol tracking.

12. The apparatus for testing of claim 9, wherein said means for creating the sampled waveform creates the sampled waveform with at least one impairment from a group consisting of adjacent channel interference, co-channel interference, gaussian noise, phase noise and Rician fading.

13. The apparatus for testing of claim 12, wherein said means for creating the sampled waveform comprises means for mixing the base band signals with plus and minus 6 kHz oscillation signals to create the adjacent channel interference impairment.

14. The apparatus for testing of claim 12, wherein said means for creating the sampled waveform comprises means for mixing the base band signals with plus and minus 3 kHz oscillation signals to create the co-channel interference impairment.

15. The apparatus for testing of claim 12, wherein said means for creating the sampled waveform comprises:

a random number generator; and means for summing the base band signals with an output of said random number generator to create the gaussian noise impairment.

16. The apparatus for testing of claim 12, wherein said means for creating the sampled waveform comprises:

means for generating uncorrelated gaussian noise from a plurality of first sources;

means for multiplying the uncorrelated gaussian noise from said plurality of first sources with the base band signals to provide a first multiplied signal;

means for generating uncorrelated gaussian noise from a plurality of second sources;

means for multiplying the uncorrelated gaussian noise from said plurality of second sources with the base band signals shifted by 90 degrees in phase to provide a second multiplied signal; and means for summing the first and second multiplied signals to create the Rician fading impairment.

17. The apparatus for testing of claim 12, wherein said means for creating the sampled waveform comprises:

means for creating a gaussian pair with a floating number between −1 and +1;

means for filtering the gaussian pair to obtain a phase noise mask; and means for filtering the base band signals and the phase noise mask to create the phase noise impairment.

* * * * *